United States Patent
Englund et al.

(10) Patent No.: US 12,365,626 B2
(45) Date of Patent: *Jul. 22, 2025

(54) PERMEABLE PAVEMENT SYSTEM INCLUDING A PERMEABLE PAVEMENT COMPOSITION AND A RELATED METHOD

(71) Applicants: The Boeing Company, Arlington, VA (US); Washington State University, Pullman, WA (US)

(72) Inventors: Karl Richard Englund, Moscow, ID (US); Somayeh Nassiri, Pullman, WA (US); Liv Martha Haselbach, Galveston, TX (US); Hui Li, Pullman, WA (US); Haifang Wen, Pullman, WA (US); Kenneth W. Fischer, Issaquah, WA (US)

(73) Assignees: THE BOEING COMPANY, Arlington, VA (US); WASHINGTON STATE UNIVERSITY, Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,552

(22) Filed: Dec. 13, 2023

(65) Prior Publication Data

US 2024/0116812 A1    Apr. 11, 2024

Related U.S. Application Data

(63) Continuation of application No. 15/639,678, filed on Jun. 30, 2017, now Pat. No. 11,884,591.

(Continued)

(51) Int. Cl.
*C04B 20/00* (2006.01)
*B28B 3/02* (2006.01)
(Continued)

(52) U.S. Cl.
CPC ............ *C04B 20/0068* (2013.01); *B28B 3/02* (2013.01); *B28B 11/245* (2013.01); *B28C 5/40* (2013.01);
(Continued)

(58) Field of Classification Search
CPC ... C04B 20/0068; C04B 18/167; C04B 28/04; C04B 28/02; B28B 3/02; B28B 11/245;
(Continued)

(56) References Cited

PUBLICATIONS

Rangelov et al. Using carbon fiber composites for reinforcing pervious concrete. Construction and Building Materials (2016) 875-885. (Year: 2016).*

(Continued)

*Primary Examiner* — John E Uselding
(74) *Attorney, Agent, or Firm* — MH2 Technology Law Group LLP

(57) ABSTRACT

A permeable pavement and cured fiber composition and a related method are provided. The permeable pavement composition includes a quantity of pavement material, and a quantity of cured carbon fiber composite material (CCFCM) configured to be added to the pavement material to produce a reinforced composition having improved characteristics. An example of pavement material includes a pervious concrete material. The method includes providing a quantity of pavement material and adding a quantity of cured carbon fiber composite material to the pavement material to produce a reinforced composition having improved characteristics.

20 Claims, 16 Drawing Sheets

Related U.S. Application Data

(60) Provisional application No. 62/380,343, filed on Aug. 26, 2016.

(51) Int. Cl.
*B28B 11/24* (2006.01)
*B28C 5/40* (2006.01)
*C04B 18/167* (2023.01)
*C04B 28/02* (2006.01)
*C04B 28/04* (2006.01)
*E01C 7/14* (2006.01)
*E01C 11/22* (2006.01)
*C04B 111/00* (2006.01)
*C04B 111/34* (2006.01)

(52) U.S. Cl.
CPC ............ *C04B 18/167* (2013.01); *C04B 28/02* (2013.01); *C04B 28/04* (2013.01); *E01C 7/14* (2013.01); *E01C 7/142* (2013.01); *E01C 11/226* (2013.01); *C04B 2111/00284* (2013.01); *C04B 2111/0075* (2013.01); *C04B 2111/343* (2013.01); *C04B 2201/50* (2013.01); *Y02A 30/30* (2018.01); *Y02W 30/91* (2015.05)

(58) Field of Classification Search
CPC ......... B28C 5/40; E01C 7/142; E01C 11/226; E01C 7/14
See application file for complete search history.

(56) References Cited

PUBLICATIONS

Qing, Ye et al., "Civil Engineering Materials (Second Edition)", China Quality Inspection Publishing Society, Sep. 2013, pp. 277-279.

Weizbacker, H. "Eco-friendly pavement may fortify longevity of pathways," The Daily Evergreen, Nov. 17, 2015, HTTPS://dailyevergreen.com/9305/news/eco-friendly-pavement-mav-fortify-longevity-of-pathyways/.

Zhengbo, T. et al., "Recycling and Application FRP Waste Materials", Copper Industry Engineering, Aug. 15, 2011, pp. 34-36.

* cited by examiner

PERMEABLE PAVEMENT SYSTEM INCLUDING A PERMEABLE PAVEMENT COMPOSITION AND A RELATED METHOD

CROSS-REFERENCE TO RELATED APPLICATION

This application is a Continuation of U.S. application Ser. No. 15/639,678 filed Jun. 30, 2017, and claims the benefit of, and priority to, said application Ser. No. 15/639,678 and U.S. Provisional application Ser. No. 62/380,343 filed on Aug. 26, 2016, which are both incorporated herein by reference in its entirety.

TECHNOLOGICAL FIELD

The present disclosure relates generally to reinforced permeable pavement compositions. More particularly, the present disclosure relates to a permeable pavement and cured carbon fiber composition and a related method for enhanced mechanical reinforcement and durability.

BACKGROUND

Pervious concrete (PC) is one pavement out of the suite of permeable pavements (e.g., asphalt, concrete, stone/gravel, clay, etc.) that simultaneously serves storm water runoff management and supports vehicular or pedestrian traffic. PC is growing in popularity among municipalities and transportation agencies for applications such as bike lanes, pedestrian walkways, sidewalks, parking lots, low-volume roadways and others. The increased application is mainly due to PC's environmental benefits, such as underground water system restoration and storm water runoff reduction. When used as a pavement surface course, PC may mitigate traffic noise and potentially reduce the heat island effect.

However, when compared to some traditional pavement materials (e.g., Portland cement concrete (PCC)), PC lacks strength capabilities. This is because PC essentially eliminates fine aggregates in its composition and includes a gap or open gradation of coarse aggregate, which facilitates the flow of water. Further, due to the lack of fine aggregate, the coarse aggregate grains in PC are bounded solely by a thin layer of cement paste, which results in lower mechanical properties of PC as compared to traditional PCC, where coarse aggregate is embedded in the matrix. Typical values of 28-day compressive strength for PC range from about 2.8 MPa to about 28 MPa as opposed to about 20 MPa to about 40 MPa for traditional PCC. Accordingly, it would be desirable for a permeable pavement (e.g., pervious concrete) to have improved characteristics that simultaneously provide environmental benefits (e.g., underground water system restoration and storm water runoff reduction), while maintaining the compressive strength of traditional pavement materials.

BRIEF SUMMARY

Example implementations of the present disclosure are directed to a permeable pavement and cured carbon fiber composition and a related method. Example implementations provide a reinforced permeable pavement composition having improved characteristics in terms of durability, wear, workability during placement, and variability as compared with other non-reinforced permeable pavement materials and/or other traditional pavement materials.

The present disclosure provides a permeable pavement composition comprising a quantity of pavement material and a quantity of cured carbon fiber composite material (CCFCM) configured to be added to the pavement material to produce a reinforced composition having improved characteristics.

In some other aspects, the present disclosure provides a method of making a permeable pavement composition comprising: providing a quantity of pavement material; and adding a quantity of cured carbon fiber composite material (CCFCM) to the pavement material to produce a reinforced composition having improved characteristics.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 15:
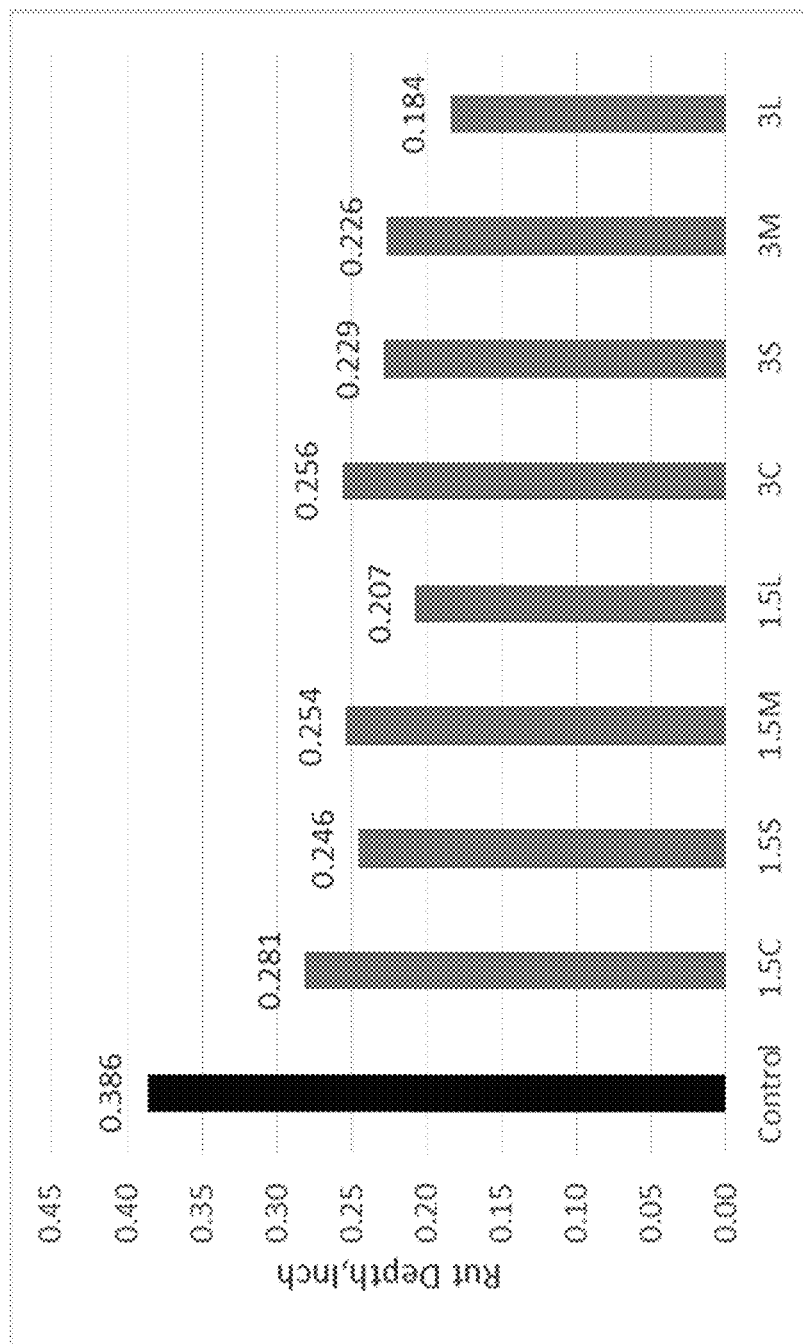
Figure 16:
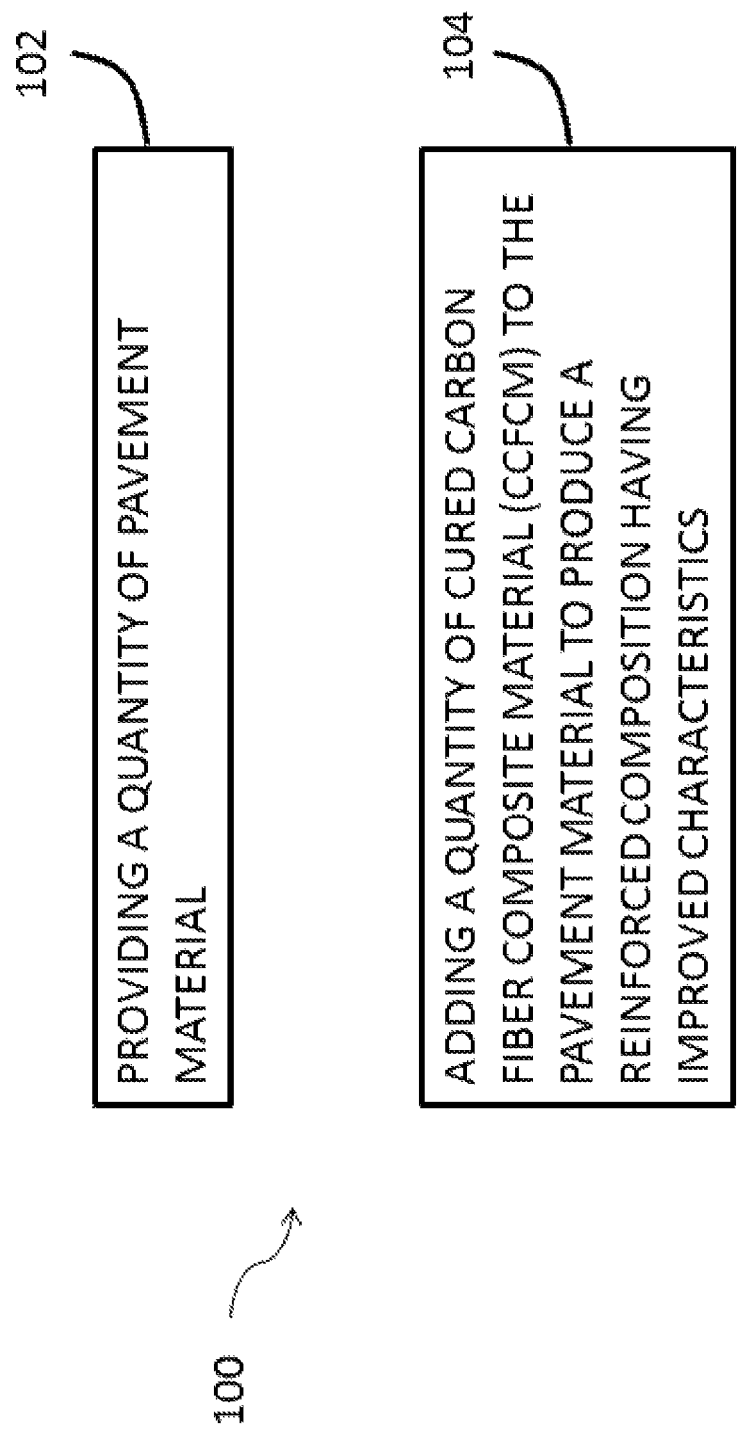

FIG. 15 illustrates an exemplary graphical representation of a rutting depth performance for exemplary asphalt compositions as obtained through the Hamburg Wheel Track test method according to some aspects of the present disclosure; and FIG. 16 illustrates a method flow diagram for a method for making a permeable pavement composition comprising a pavement material and a cured carbon fiber composite material according to some aspects of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to a permeable pavement material and cured carbon fiber composition material (CCFCM) and a related method. In some exemplary implementations, the present disclosure provides a reinforced pervious concrete composition having improved physical properties, improved chemical compositions, improved functional performances, and the like (i.e., "improved characteristics"), when compared to traditional concrete materials or non-reinforced pervious concrete materials. In other aspects, the present disclosure provides a reinforced porous asphalt composition having improved characteristics when compared to traditional asphalt materials or non-reinforced porous asphalt materials.

More particularly, the improved characteristics comprise, for example, an increased or maintained split tensile strength, an improved or maintained modulus of elasticity, improved or maintained abrasion resistance, increased ductility, improved or maintained fatigue cracking resistance, improved or maintained low temperature cracking, and/or improved or maintained rutting resistance. Alternatively, or in addition to those described above, the improved characteristics can further comprise, for example, a maintained or decreased porosity, an increased or maintained filtration rate, and/or an increased or maintained compressive strength. The improved characteristics can also comprise a reduction in toxicity, such that the reinforced compositions disclosed herein are substantially non-toxic to aquatic and/or semi-aquatic life and aid in the mitigation of storm water pollutants. Such exemplary improved characteristics allow the reinforced compositions to be utilized in multiple applications, such as, transportation applications (e.g., bike lanes, pedestrian walkways, sidewalks, parking lots, roadways and others, etc.), as well as any other application where pavement compositions are typically utilized.

The pavement material is, in some aspects, any type of traditional pavement material such as concrete, asphalt, clay, gravel, etc. As noted herein, the terms "pervious", "permeable", "porous", and the like are synonymous when referenced with the term "pavement material" or "pavement." The type of pavement material used in the composition is dependent on the pavement application.

An exemplary pavement material comprises pervious concrete (PC). PC is prepared, in some exemplary implementations, as a mixture comprised of cement, water, admixtures, and coarse aggregate. In some aspects, little to substantially no fine aggregate is included in the PC mixture. One exemplary PC mixture comprises a Type I/II ordinary Portland Cement Concrete (PCC) and saturated surface dry (SSD) crushed basalt coarse aggregate incorporated therewith and having a nominal maximum size of $3/8$ inches, a specific gravity of about 3.102, and about 3.11 percent water absorption.

In some mixtures, a certain percentage of the cement is replaced with secondary cementitious materials such as fly ash, slag, silica fume, and others. For example, about 15 percent of the cement by mass is replaced with Type F fly ash, although this percentage is variable between about 10 percent and about 40 percent of the cement by mass. Water to cementitious ratio (w/cm) is achievable at, for example, about 0.24. However, the water to cementitious ratio is modifiable according to the PC mixture.

In some aspects, a rheology-modifying chemical admixture is used to delay the setting of the PC mixture, providing more workability time. For example, approximately 583.0 ml of admixture are used. Additionally, the PC mixture is designed following a mixture design procedure. For example, a PC mixture is designed following the mixture design procedure available in ACI 522-R-10, using a target porosity of about 27 percent (i.e., about 27 percent air voids).

Accordingly, exemplary ranges for a reinforced composition including PC are provided below in TABLE 1, where ranges in proportioning of the pavement material and the CCFCM are clearly set forth. In one exemplary aspect, a quantity of CCFCM added to the PC mixture is about 0.5 percent to about 5.0 percent CCFCM by volume of the reinforced PC composition.

TABLE 1

| Material | Amount per $m^3$ of PC Mixture |
|---|---|
| SSD Coarse aggregate [kg] | 1000-4000 |
| Fine aggregate [kg] | 0.0-200 |
| Water [kg] | 50-150 |
| Cement [kg] | 150-320 |
| Fly ash [%] | 10-40% replacement of cement within PC mixture |
| Admixture [ml] | As needed |
| CCFCM [kg] | 0.0-100.0 (0.0-6.0 percent volume PC) |

Another exemplary pavement material comprises porous asphalt (PA). As with PC, PA is prepared using the same methods as traditional asphalt but little to substantially no fine aggregate is included in the PA mixture. PA is prepared, in some exemplary implementations, as a mixture comprised of binder and an aggregate, which is incorporated with a quantity of CCFCM to produce a reinforced PA composition. The aggregate comprises, for example, particles or elements such as stone, sand, gravel, and the like, while the binder mixture comprises, for example, a crude oil blend, a nonpetroleum blend, and the like. In some aspects, the PA mixture is prepared from about a 95% aggregate and a 5% binder mixture incorporated with about a three percent, about a six percent, or about a nine percent CCFCM per total weight of the asphalt binder. These values correspond to 0.15 percent CCFCM, about 0.30 percent CCFCM, or about 0.45 percent CCFCM per total weight of the reinforced PA composition. Other percentages of the binder mixture to CCFCM dosage are also contemplated depending on the use application of the reinforced PA composition.

A quantity of the CCFCM is added to the pavement material to produce a reinforced composition having improved characteristics. In some instances, the quantity of the CCFCM added is dependent on the quantity of the pavement material added (and vice versa), as well as various characteristics of the pavement material and the CCFCM.

One or more components of the CCFCM comprise, in some aspects, polyacrylonitrile (PAN)-type carbon fiber or similar fiber and a binding polymer or matrix material such as a thermoplastic resin, e.g., an epoxy resin. In some other aspects, some of the one or more components of the CCFCM are recycled materials (e.g., waste synthetic fibers, waste carbon fiber composites (CFCs), and the like embedded in a matrix material), which may include undesirably large particle size fractions. Accordingly, one or more components of the CCFCM may require further processing and/or refinement to separate the components of the CCFCM into different particle size fractions. The CCFCM is, in some exemplary aspects, processed and/or refined in any manner of ways. As disclosed herein, the processing and/or refining methods advantageously include low-energy methods that preserve the characteristics of the waste material components of the CCFCM. By contrast, known recycling or reuse methods are known to process and/or refine the waste material components in such a manner that is environmentally hazardous, inefficient, and/or expensive (e.g., a chemical solvent or burn processing method).

Initially, where one or more of the components of the CCFCM comprises a waste fiber material, it is desirable to separate elements of these components by reducing the size, removing cured resins etc., in a manner that is not costly and is environmentally preferred, i.e., is not a chemical and/or thermal process. As such, the elements of the CCFCM are separated by mechanical deconstruction such as shredding, hammering, milling, sieving, etc. In some aspects, the elements of the CCFCM are separated by first shredding and then refined using a mechanical refinement mechanism (e.g., a hammer-mill) through, for example, a 25.4-mm screen to separate out the coarsest particles.

In another example, the elements of the CCFCM are further separated into different particle size fractions relative to a weight by volume percentage of the composition in order to achieve properly graded classes of CCFCM for incorporation in PC or PA. Such properly graded classes of CCFCM advantageously, in some aspects, are able to maintain required infiltration rates, yet maintain or have improved workability and mechanical properties.

Figure 1:
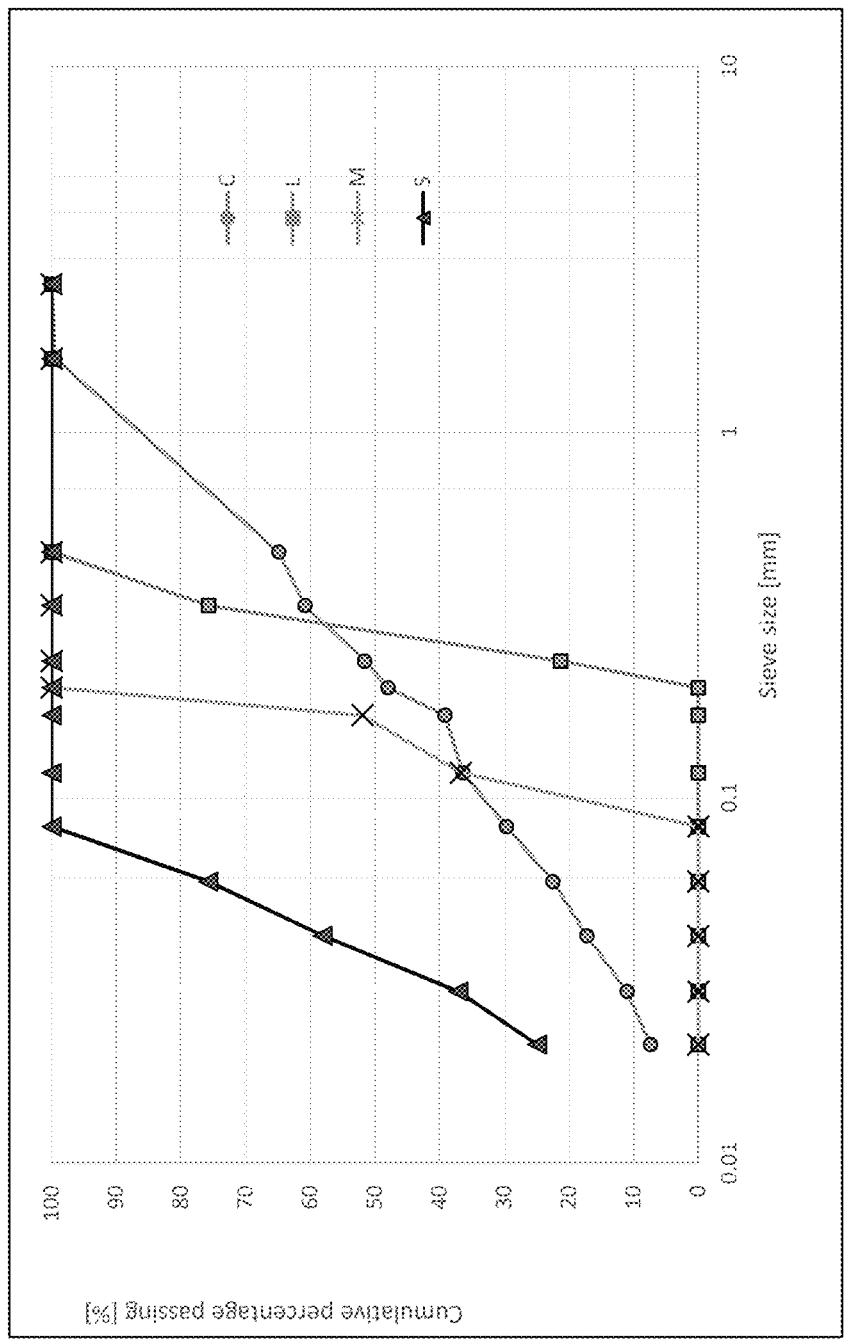
FIG. 1 illustrates an exemplary graphical representation of a particle size distribution of elements of cured carbon fiber composite material (CCFCM) according to some aspects of the present disclosure.
Figure 2:
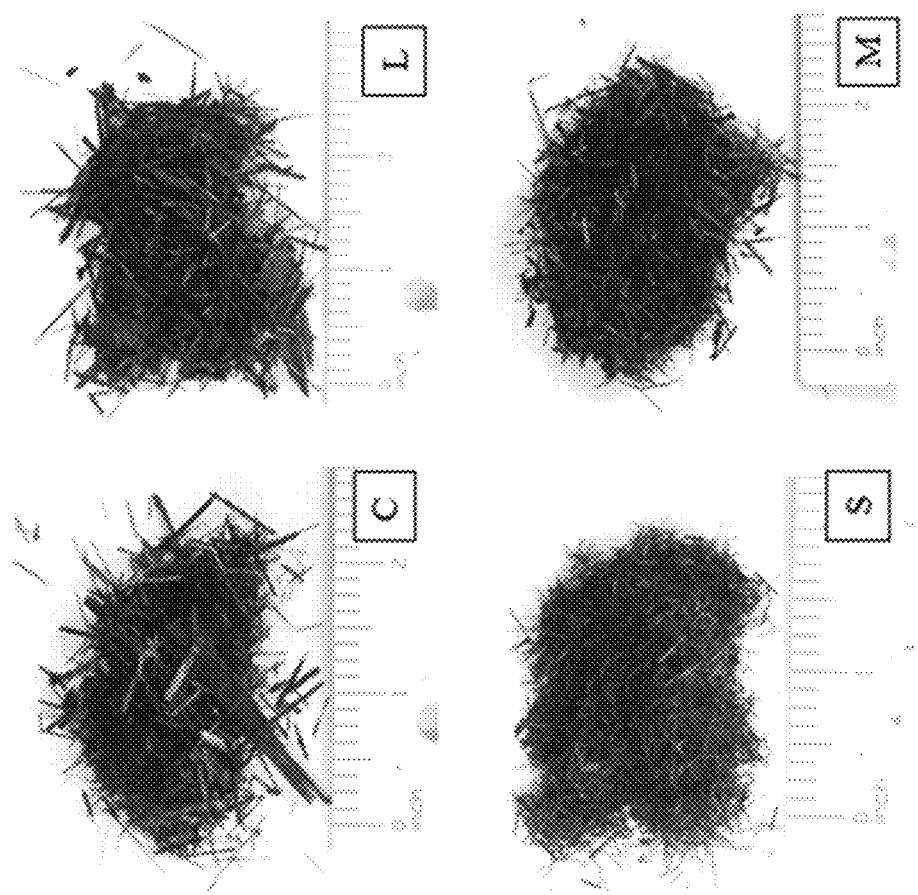
FIG. 2 illustrates four different particle size elements of CCFCM: C-combined, L-large, S-small, and M-medium according to some aspects of the present disclosure.

In one instance, the elements of the CCFCM are differentiated into four different particle size fractions, though fewer or greater groupings are also contemplated, by further mechanical screening. FIG. 1 illustrates such an instance of four different particle size fractions, which include: (C) combined: particles smaller than about 3.35 mm, (L) large: particles smaller than about 3.35 mm and larger than about 2.00 mm, (M) medium: particles smaller than about 2.00 mm and larger than about 0.841 mm, and (S) small: particles smaller than about 0.841 mm (retained on the pan). In another instance, FIG. 2 illustrates four different particle size fractions. As seen in FIG. 2, coarse and flaky CCFCM particles are contained in C and L, while S and M mainly contained particles in the form of fibers. These broadly graded classes were selected to experiment with different shapes and graded classes of CCFCM in improving the properties of PC and PA in one exemplary study. However, other combinations of graded classes and shapes are able to be used depending on processing methods, pavement designs, and/or required properties.

Consequently, the compositions and related methods, as disclosed herein provide a secondary use for an increasing waste stream of fiber materials, specifically CFCs. Expenses traditionally associated with chemical and thermal treatments to isolate elements of the waste stream of fiber materials have proven to be prohibitive. As described herein, low-energy intensive repurposing strategies advantageously recycle a waste fiber material, while allowing the waste fiber material to retain much of its original properties and to be easily dispersed into many other materials, including pavement materials.

EXAMPLE 1

An experiment was designed to investigate the effect of different CCFCM element volume fractions, as well as different particle size fractions of the elements of the CCFCM relative to a weight by volume percentage of a PC composition on the characteristics of the composition itself. Therefore, experimental samples or specimens of various compositions including a PC pavement material were prepared, the experimental samples including: one control concrete composition, three reinforced PC (rPC) compositions containing three volume fractions of a same size fraction and four rPC compositions containing four different size fractions of the processed CCFCM. The seven mixtures and their designated naming system are provided below in TABLE 2.

For each mixture, the first letter represents the CCFCM element particle size fraction, (C, L, M, and S) followed by a number that represents the CCFCM element volume fraction in percentage, 0.5, 1.0, and 1.5 percent, respectively. In the case of the control composition, the letter and the number that describe the CCFCM element size and volume fraction were replaced with 00.

TABLE 2

| Mixture ID | CCFCM Element Size | CCFCM Content [% volume of the experimental sample] |
| --- | --- | --- |
| Control 00 | Not Applicable | Not Applicable |
| C0.5 | Combined | 0.5 |
| C1 | Combined | 1 |
| C1.5 | Combined | 1.5 |
| S1.5 | Small | 1.5 |
| M1.5 | Medium | 1.5 |
| L1.5 | Large | 1.5 |

The PC was mixed in accordance with the ASTM C192. Prior to mixing, elements of the CCFCM and the admixture were dispersed in the total water for the batch. Three types of specimens were cast for this experiment: small cylindrical specimens (about 100 mm in diameter by about 200 mm in height), prepared for 7- and 28-day compressive strength and Cantabro tests, large cylindrical specimens (about 150 mm in diameter by about 300 mm in height) for a 7-day split tensile strength test, and slabs (about 28.6 mm in length by about 28.6 mm in width by about 8.3 mm in height) for mass loss in surface abrasion tests. During the mixing it was observed that elements of the CCFCM dispersed evenly and without clumping throughout the fresh PC material.

A compaction method for the cylinders was selected to result in uniformly compacted specimens for strength testing, while the slabs were compacted to represent field placement and compaction procedure. A quantity of the composition placed in each specimen mold was predetermined according to the designed density. Small and large cylindrical samples were filled with a determined quantity of the composition in two and three lifts, respectively. Lower lifts were compacted with about 15 blows and about 20 blows of a standard Proctor hammer for small and large cylinders, respectively, where the hammer was a 5.5 pound hammer falling about 12 inches. The final lift was placed by filling the mold to the top and compacting with the needed number of Proctor hammer blows to fit the predetermined weight of the composition in the mold. Slab molds were filled with fresh PC in one lift and compacted with about 33 blows of the standard Proctor hammer. Subsequently slabs were compacted using a hydraulic compression testing machine, applying the load of about 3.1 kN, corresponding to a Bunyan roller compaction used for compacting PC in the field. To make sure the compositions filled the mold consistently, the molds were hit with a plastic mallet on the side all around each specimen about five times per lift for small cylinders and 10 times per lift for large cylinders and slabs.

All specimens were cured in closed (capped) molds for seven days in the laboratory conditions, with ambient temperature maintained at about 21 degrees Celsius.

Upon demolding the specimens at 7-day age, hardened porosity and dry density were determined in accordance with ASTM C1754. Air void content was estimated as the difference between the total volume of the specimen and the volume of the displaced water when the specimen was submerged, using EQUATION 1.

$$\text{Void content} = \left[1 - \frac{M_w - M_d}{\rho_w * V}\right] \quad \text{EQUATION 1}$$

where $M_w$ is the mass of submerged specimen, $M_d$ is the mass of dry specimen, $\rho_w$ is density of water, and V is volume of the specimen, estimated based on the average dimensions obtained from three measurements taken using a caliper. As such, in some examples, the specimen comprised an air void content or porosity of about 15 percent to about 35 percent air voids, and more particularly about 18 percent to about 28 percent air voids, which is a porosity level sufficient for the specimens to be considered a "pervious" pavement material.

Figure 3:
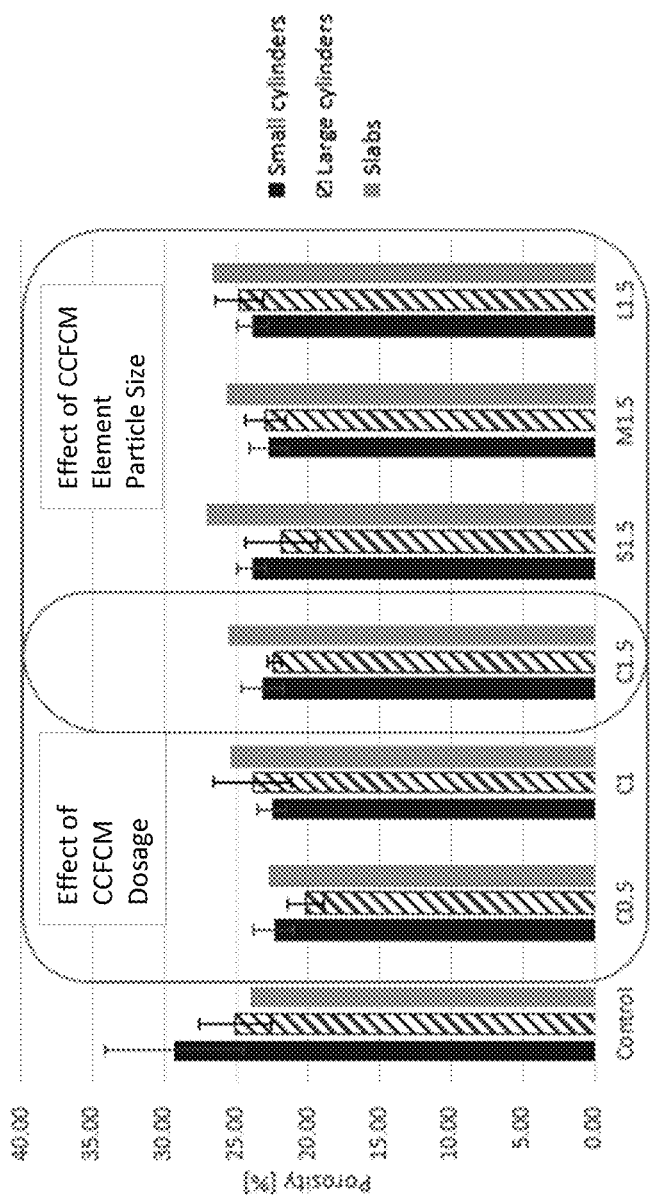
FIG. 3 illustrates an exemplary graphical representation of an average porosity based on specimen type, where the number of specimens includes seven small cylinders, five large cylinders and one slab per composition according to some aspects of the present disclosure.

FIG. 3 illustrates the average porosity in a three data series, representing small cylinders, large cylinders, and slabs. As evident in FIG. 3, all the rPC compositions presented lower average porosities (about 22 percent to about 24 percent air voids) when compared to the control PC composition (about 28 percent air voids). It was also evident from the standard deviation (whisker bars in FIG. 3) that the rPC specimens from the same composition were compacted significantly more consistently than the control specimens.

To establish the significance of the effect of the CCFCM elements on rPC porosity, Pearson t-tests were conducted on small cylinders from each composition and the control composition. The test results show that the difference in porosity of rPC compositions and control composition was statistically significant at about a 95 percent confidence interval (p-value is zero for each rPC composition when compared to the control composition). From a practical point of view, the significantly lower porosity achieved for rPC compositions with the same compaction effort implies that the addition of the CCFCM elements to the PC compositions increases the mixture's workability. This is advantageous considering the low slump and workability of PC, especially when placing in the field in hot weather conditions.

Figure 4:
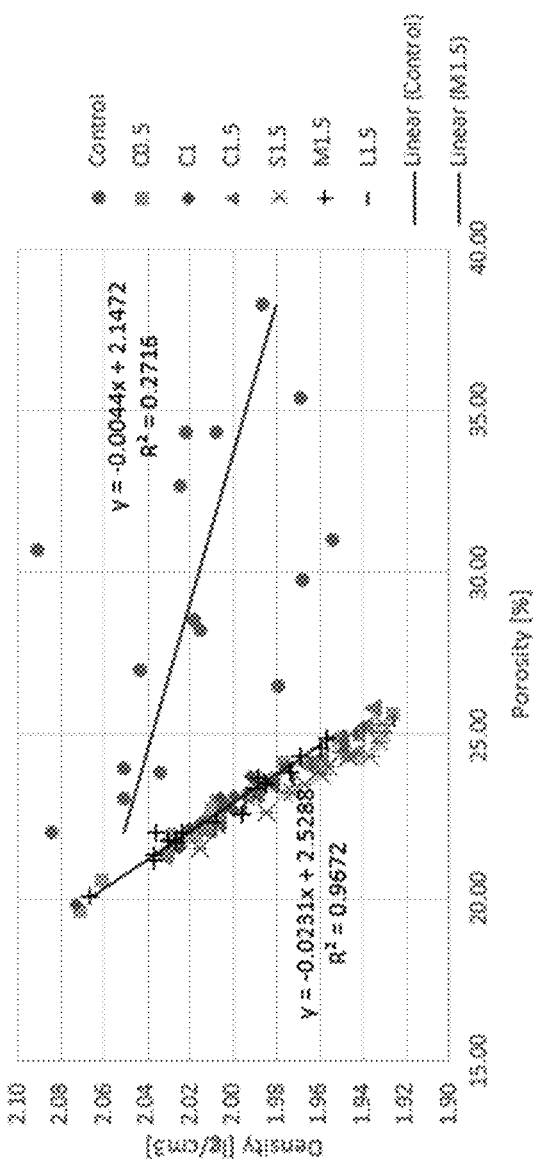
FIG. 4 illustrates an exemplary graphical representation of a correlation between porosity and density for small cylinders according to some aspects of the present disclosure.

Dry density was estimated for each specimen. The correlation between porosity and dry density for small cylindrical specimens from all compositions is presented in FIG. 4. As illustrated in FIG. 4, rPC compositions showed a linear relationship between porosity and dry density ($R^2=0.97$), while porosity of the control composition showed a disparity in relatively small range of density. The relatively consistent density for the control samples despite the clear change in porosity was most likely due to variability in the volume of the specimens. The linear correlation between density and porosity for the rPC specimens demonstrated again that the CCFCM elements resulted in higher workability and therefore uniform volumes among all rPC specimens.

Infiltration rate is one of the properties of PC that is desirable for storm water management applications. Therefore, the infiltration rate of the PC specimens was determined based on the procedure outlined in ASTM C1701 at 7-day age. Cylindrical specimens were wrapped on the sides with shrink-wrap, which enabled the water to be poured from the top and exfiltrated through the bottom of the specimens without loss on the sides. Infiltration rate of the slab specimens was determined by the usage of a plastic infiltration ring, fastened to the slab by the plumber's putty. An infiltration rate for the slabs was reported as the average of the measurements from four different locations on each slab. Infiltration rates (I) were determined based on EQUATION 2:

$$I = \frac{4V}{D^2 \pi t} \quad \text{EQUATION 2}$$

where, V is volume of infiltrated water, D is the diameter of the specimen in case of cylindrical specimens and the diameter of the infiltration ring in the case of slab specimens and t is the time required for the measured volume of water to infiltrate through the composition. Accordingly, one exemplary increased infiltration rate was reported at about 200 inches per hour to about 3,000 inches per hour.

Figure 5:
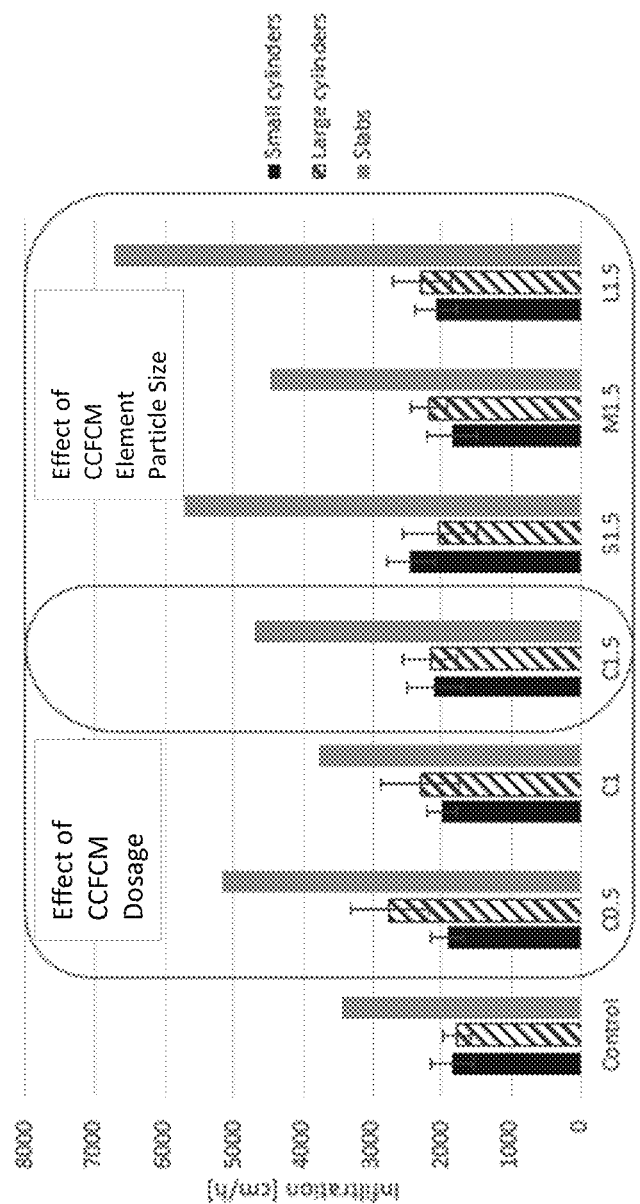
FIG. 5 illustrates an exemplary graphical representation of an average infiltration rate based on a specimen type according to some aspects of the present disclosure.

FIG. 5 illustrates the infiltration rates for each specimen category. As seen in FIG. 5, rPC specimens generally presented higher infiltration rates than the control specimen. The increase in infiltration rates ranged from about 4 percent to about 32 percent for small cylinders, from about 14 percent to about 55 percent for large cylinders, and from about 11 percent to about 96 percent for slabs. As such, the variability in the increase in infiltration rates was attributable, at least in part, to a geometry, a cross-sectional area, a size, a shape, and the like of the specimens.

Also, referring back to FIG. 3, rPC specimens presented lower porosity compared to the control composition. Consequently, despite the lower porosity for the rPC specimens, the higher infiltration rates evidenced the elements of the CCFCM influencing the connectivity of the air voids and facilitating the flow of water through the air voids. It should be noted that the average values of infiltration for all the cylindrical specimens were well within the typical range for PC, i.e., about 750 cm/h to about 5,000 cm/h.

As illustrated in FIG. 5, out of the different specimen categories, the slabs presented the highest infiltration rates for all the specimen types. High values for the infiltration of the slabs were caused by the placing methodology (one lift for the slabs as opposed to two and three lifts for small and large cylinders, respectively) and the lower compaction energy in comparison with the cylindrical specimens.

Additionally, as illustrated in FIG. 5, CCFCM dosage did not present a significant influence on the average infiltration rate in the case of cylindrical specimens, while the infiltration of the slabs was the lowest at mid-range CCFCM content. When different CCFCM types were compared, it was noted that S and L fractions were associated with higher values of infiltration in the case of the slabs and small cylinders. The infiltration rate of large cylinders was relatively consistent for all rPC specimens containing about 1.5 percent CCFCM.

A compressive strength ($f'_c$) test was performed on small cylindrical specimens at 7- and 28-day ages, according to ASTM C39. TABLE 3 shows the average 7- and 28-day $f'_c$ results with corresponding standard deviations for all experimental specimens. Furthermore, a Pearson statistical t-test for two samples at a 95 percent confidence interval was conducted to determine whether the mechanical properties of rPC and control specimens differed significantly. P-values were reported in TABLE 3.

Consequently, TABLE 3 illustrates that only rPC specimens C1 outperformed the control specimens in terms of 7-day $f'_c$. Conversely, on 28-day tests, five out of the six rPC specimens presented higher $f'_c$ than the control specimens (by about 4 percent to about 11 percent). The specimen with the lowest $f'_c$ on both 7- and 28-day tests was S1.5. Overall, although no significant increase was gained in average 28-day $f'_c$ compared to the control specimens, the average 28-day $f'_c$ for all the rPC specimens was greater than about 20 MPa, which is a typical value for PC materials. As such, in one instance, the increased or maintained compressive strength is about 5 MPa to about 30 MPa.

Figure 6:
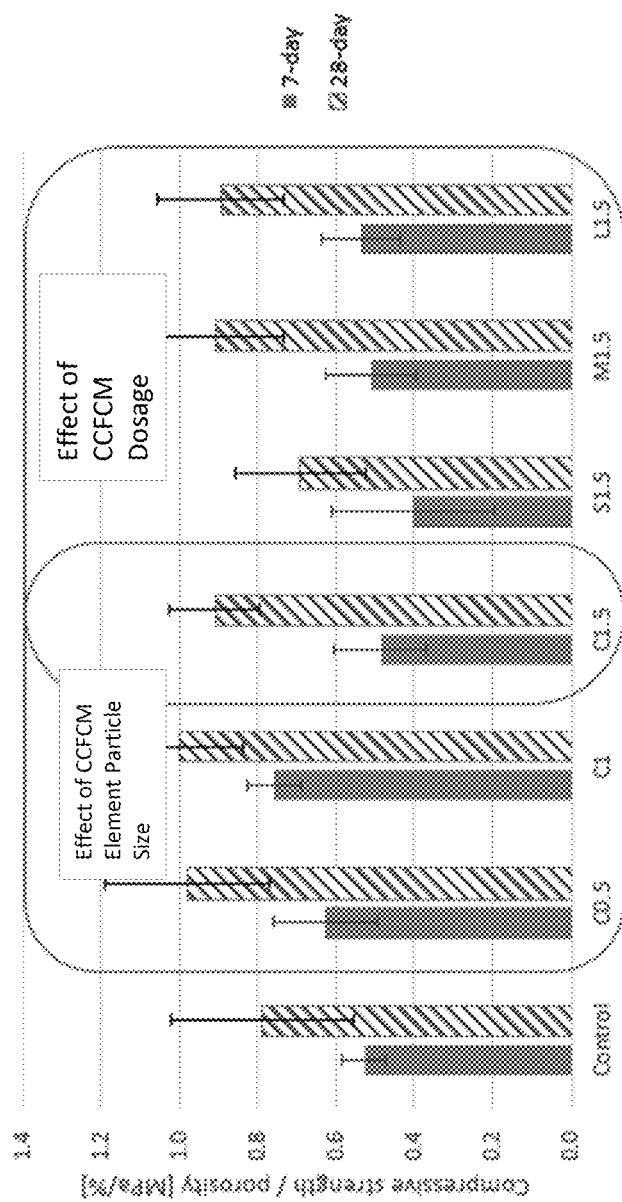
FIG. 6 illustrates an exemplary graphical representation of an average compressive strength ($f'_c$) on 7- and 28-day test normalized by porosity according to some aspects of the present disclosure.

When evaluating $f'_c$ test results for PC materials, porosity is an influential characteristic. Specimens with higher porosity generally present lower strengths. To consider the effect of porosity on the $f'_c$ test results, FIG. 6 illustrates the 7- and 28-day $f'_c$ results for each specimen normalized by their corresponding porosity. FIG. 6 isolates the potential effect of porosity on the tests results to focus solely on the effect of CCFCM addition. The increase in 28-day $f'_c$ for almost all rPC specimens with reference to the control specimens is evident in FIG. 6. When different CCFCM dosages were compared, it was observed that C1 yields the highest $f'_c$ on both test days. When different CCFCM types were compared, it was observed that the coarser CCFCM element particle size fractions generally resulted in higher 28-day $f'_c$.

When gains in $f'_c$ from 7- and 28-day were compared, it was observed that all rPC specimens, except C1, underwent more significant increase in $f'_c$ than the control specimen. This behavior shows that the CCFCM elements were likely to have hindered or slowed down the hydration progress. All of the rPC specimens with about 1.5 percent CCFCM had $f'_c$ gains higher than about 60 percent, which was substantially higher than that of the control specimens (about 26 percent).

To further examine the effect of CCFCM on $f'_c$, the failure modes in all specimens were investigated. Eight major failure types are identified for the 7- and 28-day compressive strength tests and are presented with descriptions in TABLE 4. These failure types are described based on ASTM C39 for conventional PCC. Additionally, three frequently observed failure types: bottom-up, and top-down columnar cracking, and cone with shear, were added to those defined in ASTM C39.

TABLE 3

| Test/Mixture | Control | C0.5 | C1 | C1.5 | S1.5 | M1.5 | L1.5 |
|---|---|---|---|---|---|---|---|
| Average 7-day $f'_c$ [MPa] | 15.5 | 14.0 | 16.6 | 11.0 | 9.5 | 12.0 | 12.4 |
| St. dev. [MPa] | 1.2 | 2.7 | 1.5 | 2.5 | 4.7 | 2.7 | 1.9 |
| p-value | — | 0.388 | 0.287 | 0.03 | 0.092 | 0.082 | 0.053 |
| Average 28-day $f'_c$ | 19.5 | 21.2 | 21.6 | 20.6 | 16.0 | 20.2 | 21.4 |
| St. dev. [MPa] | 3.4 | 4.4 | 1.9 | 1.8 | 3.7 | 2.1 | 2.8 |
| p-value | — | 0.550 | 0.360 | 0.585 | 0.222 | 0.713 | 0.422 |
| Average 7-day $f_t$ [MPa] | 1.8 | 2.0 | 1.8 | 2.6 | 2.2 | 2.6 | 2.2 |
| St. dev. [MPa] | 0.4 | 0.3 | 0.2 | 0.2 | 0.2 | 0.3 | 0.3 |
| p-value | — | 0.434 | 0.96 | 0.02 | 0.108 | 0.016 | 0.146 |
| Average Ec [MPa] | 21.9 | 31.7 | 29.6 | 24.5 | 31.0 | 23.4 | 32.1 |
| St. dev. [MPa] | 4.8 | 10.1 | 3.5 | 2.1 | 6.3 | 5.6 | 10.6 |
| p-value | — | 0.603 | 0.898 | 0.229 | 0.380 | 0.344 | 0.495 |

TABLE 4

| Failure type name | Bottom-up (BU) columnar cracks | Top-down (TD) columnar cracks | Columnar cracks with partially formed cones | Cone |
|---|---|---|---|---|
| Failure type from ASTM C39 | Not Available (NA) | NA | Type 3 | Type 1 |
| Description | Columnar cracks propagate from the bottom upwards evenly around. | Columnar cracks propagate from the top downwards evenly around. | Columnar cracking from both ends with partially formed cones at one end. | Well-formed cones on both ends, caps intact after failure. |
| Failure type name | Shear | Crushing of top or bottom | Cone and shear | Side fractures |
| Failure type from ASTM C39 | Type 4 | Type 6 | NA | Type 5 |
| Description | Diagonal fracture throughout, without cracking on top/bottom. | Severe cracking at top/bottom, resulting in crushing of top/bottom. | Well-formed cone at one end, prominent diagonal (shear) cracks on another. | Side fractures at top/bottom; resembles shear failure, with cracks on the top/bottom. |

Figure 7:
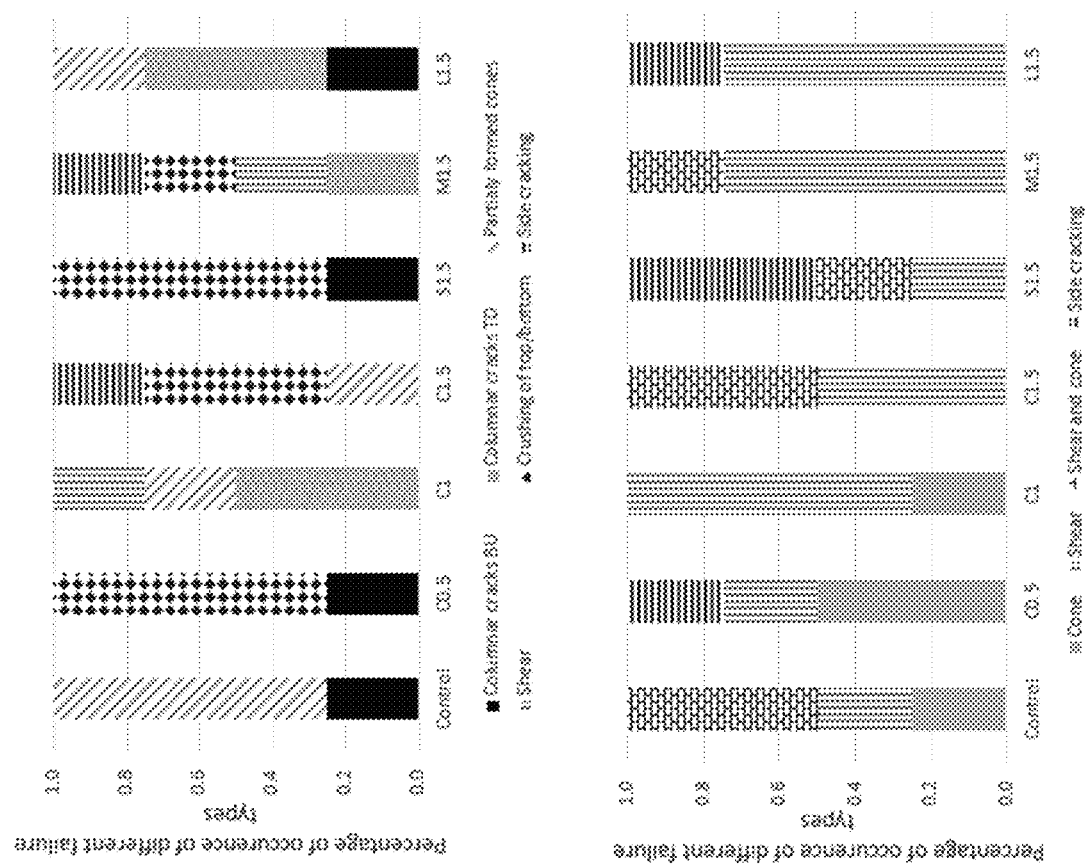
FIG. 7 illustrates an exemplary graphical representation of an occurrence of different failure types on (top) 7- and (bottom) 28-day $f'_c$ tests according to some aspects of the present disclosure.

FIG. 7 illustrates the occurrence of the different failure types on 7- and 28-day tests, respectively. Six different failure types can be observed in FIG. 7 for the 7-day test. Columnar cracking (TD and BU) and columnar cracking with partially formed cones are relatively frequent failure types. Crushing of top or bottom of the specimen is another recurrent failure type, typically associated with low $f'_c$. Shear and side cracking are less frequent failure types on 7-day $f'_c$ tests.

As illustrated in FIG. 7, on 28-day $f'_c$ testing, specimens presented four different failure types. The most common failure type was shear, followed by the combination of cone and shear. Specimens with highest 28-day $f'_c$ demonstrated cone failure type, while the specimens with lower 28-day $f'_c$ typically failed by side cracking. Based on the results in FIGS. 6 and 7, it was concluded that strength gains of PC specimens were associated with changes in structural integrity, resulting in change of prevalent failure types.

An indirect split tensile strength ($f'_t$) test was performed according to ASTM C496 on four large cylindrical specimens at 7-day age. The average 7- day $f'_t$ for all PC specimens with their corresponding standard deviations is presented in TABLE 3. Similar to $f'_c$ test results, a Pearson statistical t-test at a 95 percent confidence interval was performed on test results and p-values are listed in TABLE 3.

As seen in TABLE 3, five out of the six rPC specimens outperformed the control specimens in terms of 7-day $f'_t$ of the PC by about 11 percent to about 46 percent. The increase in $f'_t$ was statistically significant for the specimens C1.5 and M1.5. The seven-day $f'_t$ of specimens C1 was slightly lower (about three percent) than that of the control specimen, which is not statistically significant. All of the specimens with about 1.5 percent CCFCM presented relatively high values of $f'_t$ beyond about 2.2 MPa. Overall, the average 7-day $f'_t$ for all rPC specimens was about 2 MPa, which is about 26 percent higher than that of the control specimen at about 1.8 MPa. As TABLE 3 illustrates, most 7-day $f'_t$ values for rPC specimens exceeded the typical range for PC reported in other studies (from about 1.4 MPa to about 2 MPa).

Figure 8:
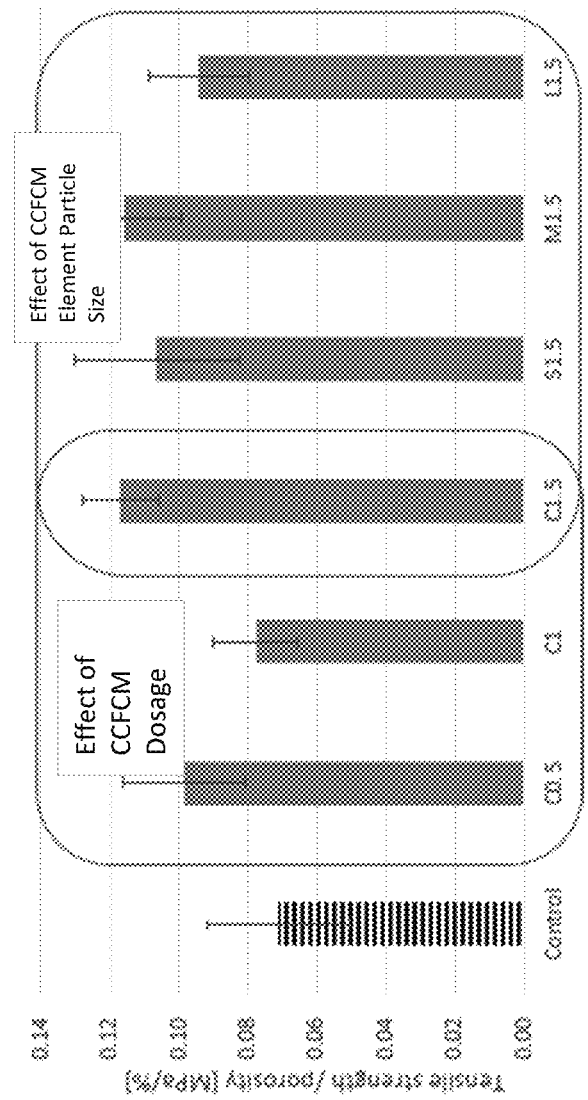
FIG. 8 illustrates an exemplary graphical representation of average tensile strength for 7-day tests according to some aspects of the present disclosure.

Similar to $f'_c$, porosity influenced $f'_t$ of the PC specimens. To isolate the effect of porosity on 7-day $f'_t$, the test result for each specimen was normalized to its corresponding porosity in FIG. 8. As seen in FIG. 8, all rPC specimens outperformed the control specimen in terms of 7-day $f'_t$ after the normalization. When different CCFCM dosages were compared, it was noted that about 1.5 percent of CCFCM elements resulted in the highest value of $f'_t$ normalized by porosity. When different CCFCM element particle size types were compared, it was concluded that combined and medium CFC element particle size fractions yielded the highest value of $f'_t$ normalized by porosity. In terms of failure types, it was observed that the experimental specimens that presented higher strength generally had full split failures and lower occurrence of failures at the lift locations.

Load-displacement measurements during testing were available for the 28-day $f'_c$ tests. The modulus of elasticity ($E_c$) was estimated as the slope of the linear trend-line used to approximate the linear portion of stress-strain curves. Initial stresses (up to about 0.35 MPa) were considered as the seating period.

Figure 9:
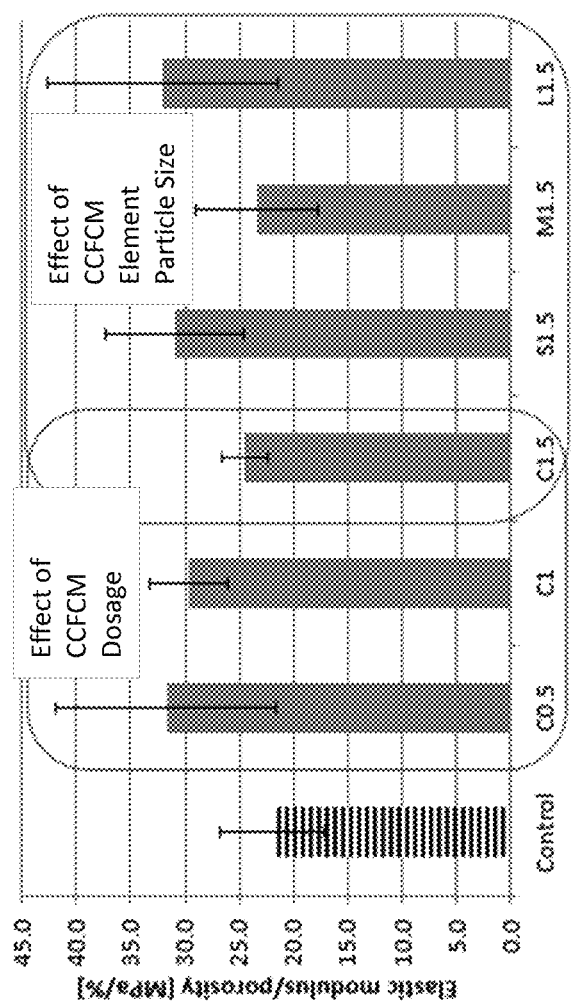
FIG. 9 illustrates an exemplary graphical representation of an average 28-day elastic modulus for all mixtures according to some aspects of the present disclosure.

The average $E_c$ with the corresponding standard deviation for every mixture is given in TABLE 3. As compressive and tensile strength test results, the Pearson's statistical tests were conducted on the values of $E_c$ and corresponding p-values are provided in the TABLE 3. As seen in TABLE 3, four out of six rPC specimens outperformed the control specimen in terms of $E_c$ (by about 4 percent to about 46 percent). Specimens C1.5 and M1.5 presented lower average $E_c$ than the control specimen, while the specimen L1.5 showed the highest $E_c$, about 32 MPa on average. FIG. 9 illustrates that the $E_c$ values were normalized by the corresponding porosities. When different CCFCM dosages were compared, it was noted that higher dosages yielded lower $E_c$ normalized to porosity. However, when different CCFCM particle sizes were compared, it was noted that small and large CCFCM fractions at about 1.5 percent volumetric dosage resulted in relatively high values of $E_c$ normalized to porosity.

Figure 10:
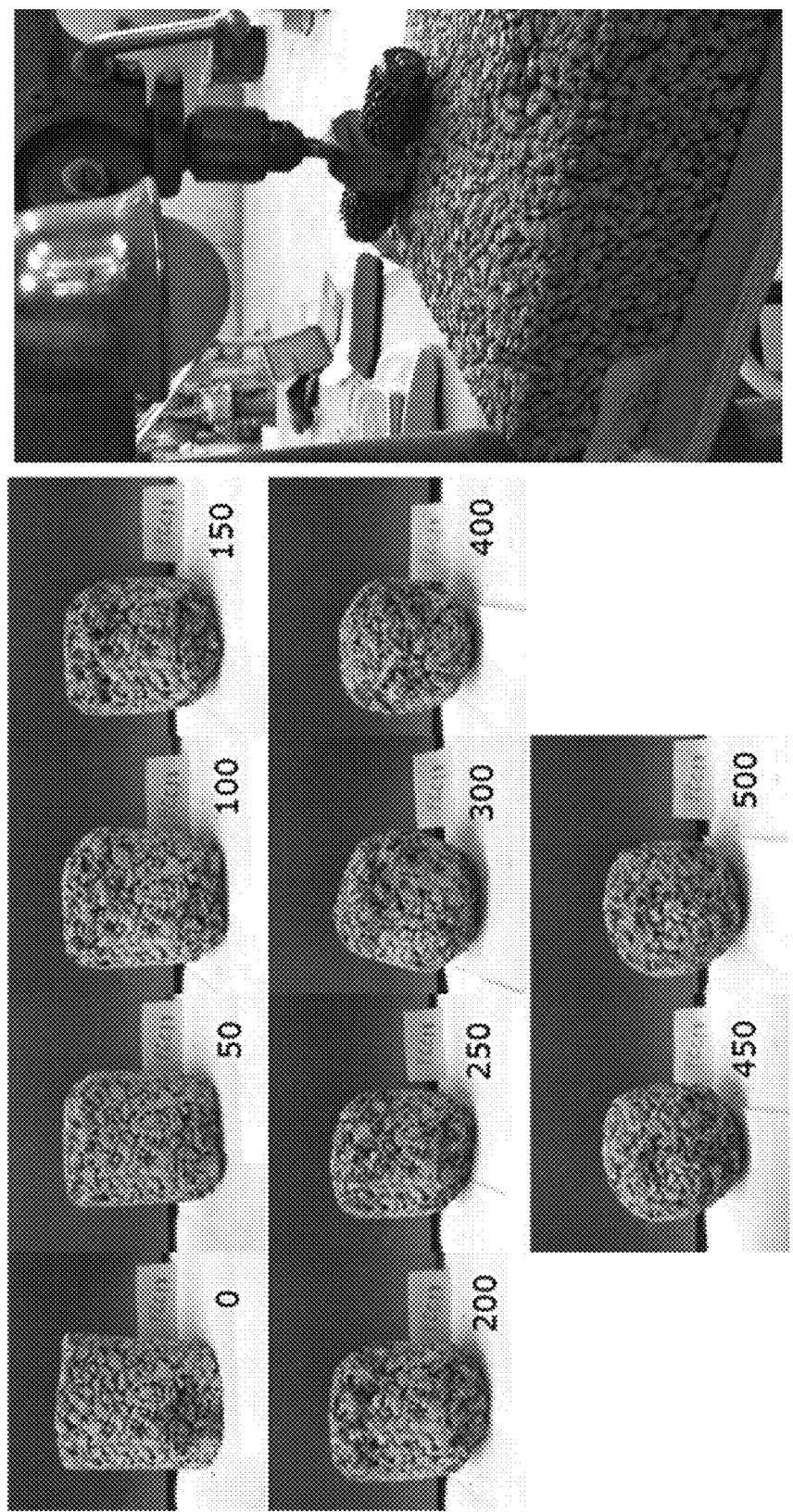
FIG. 10 illustrates a progression of degradation during Cantabro test with number of cycles provided in bottom right corner, and illustrates in the right photograph an experimental setup for the surface abrasion test according to some aspects of the present disclosure.

A Cantabro test was performed according to ASTM C1747 on four small cylindrical specimens per mixture, obtained by cutting the regular 100 mm by 200 mm cylinders in half. Specimens were tested on Cantabro about 50 days after casting. The test was conducted in a Los Angeles (LA) abrasion test machine without the steel ball charges. FIG. 10 shows the degradation of one rPC experimental specimen after every 50 cycles in the LA abrasion machine.

Figure 11:
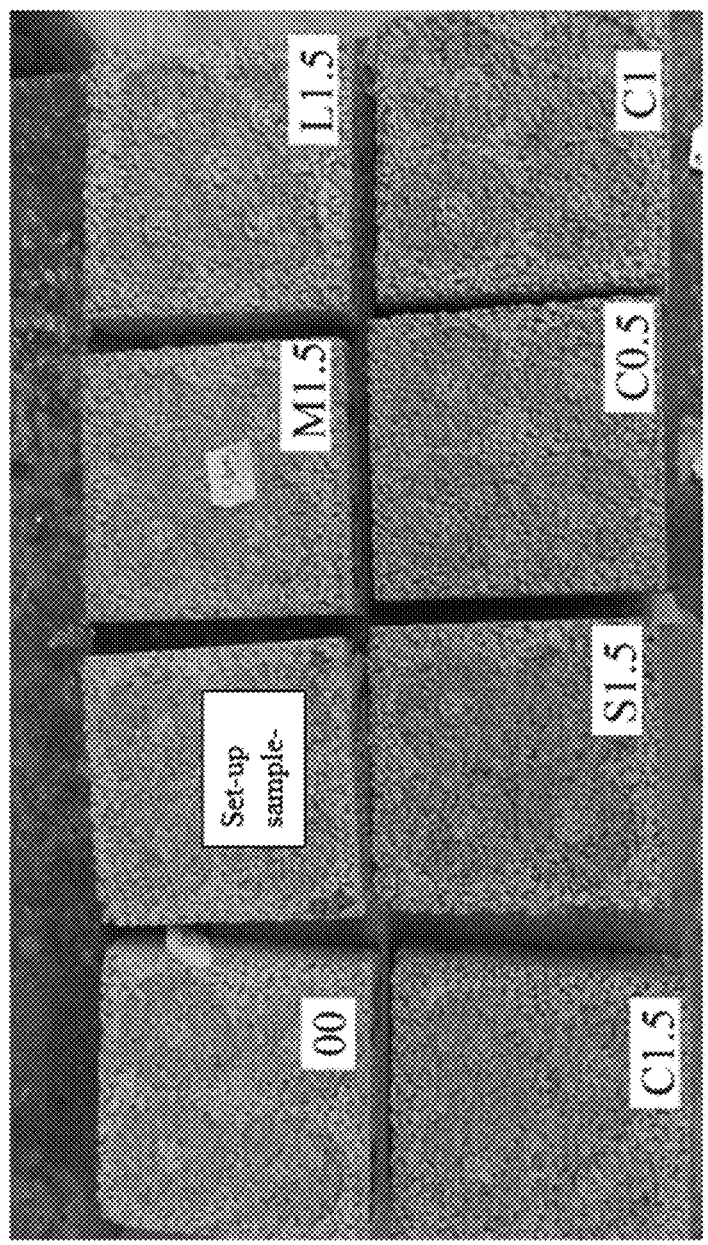
FIG. 11 illustrates all slab specimens after the surface abrasion test was conducted according to some aspects of the present disclosure.

Abrasion tests with the rotational cutter were performed according to ASTM C944, with about a 98 N load on the slabs. The test was performed at four different locations on each slab, for a total time of about 14 minutes per each location. The experimental setup for the surface abrasion test is illustrated in FIG. 10. FIG. 11 illustrates all the slab specimens after the surface abrasion test was conducted, where the set-up slab was used to set up the machine.

Figure 12:
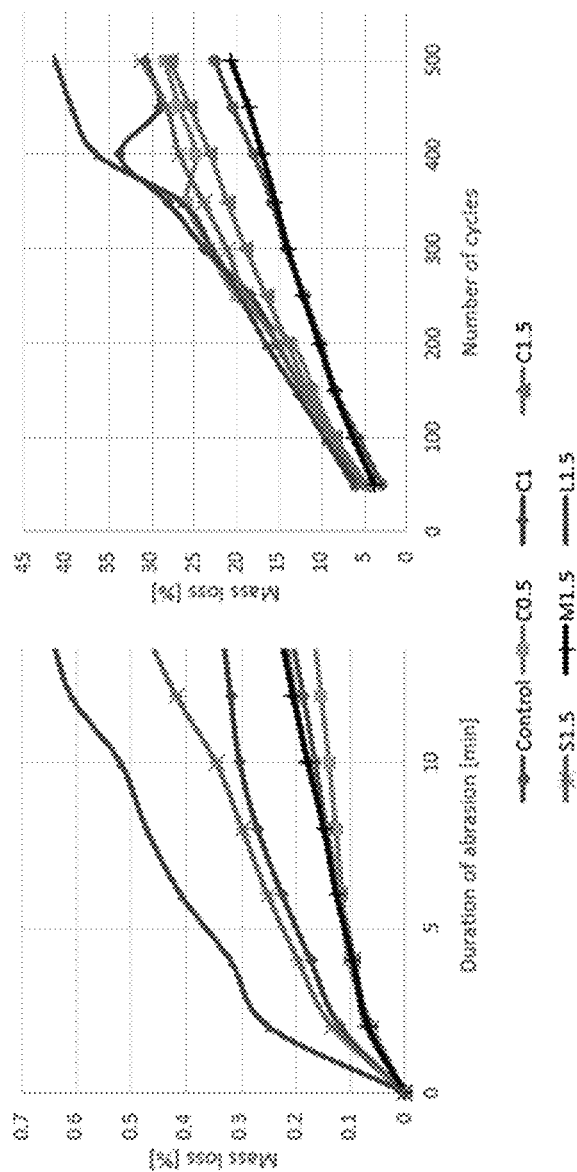
FIG. 12 illustrates an exemplary graphical representation of an average mass loss by (left) Cantabro and (right) surface abrasion according to some aspects of the present disclosure.
Figure 13:
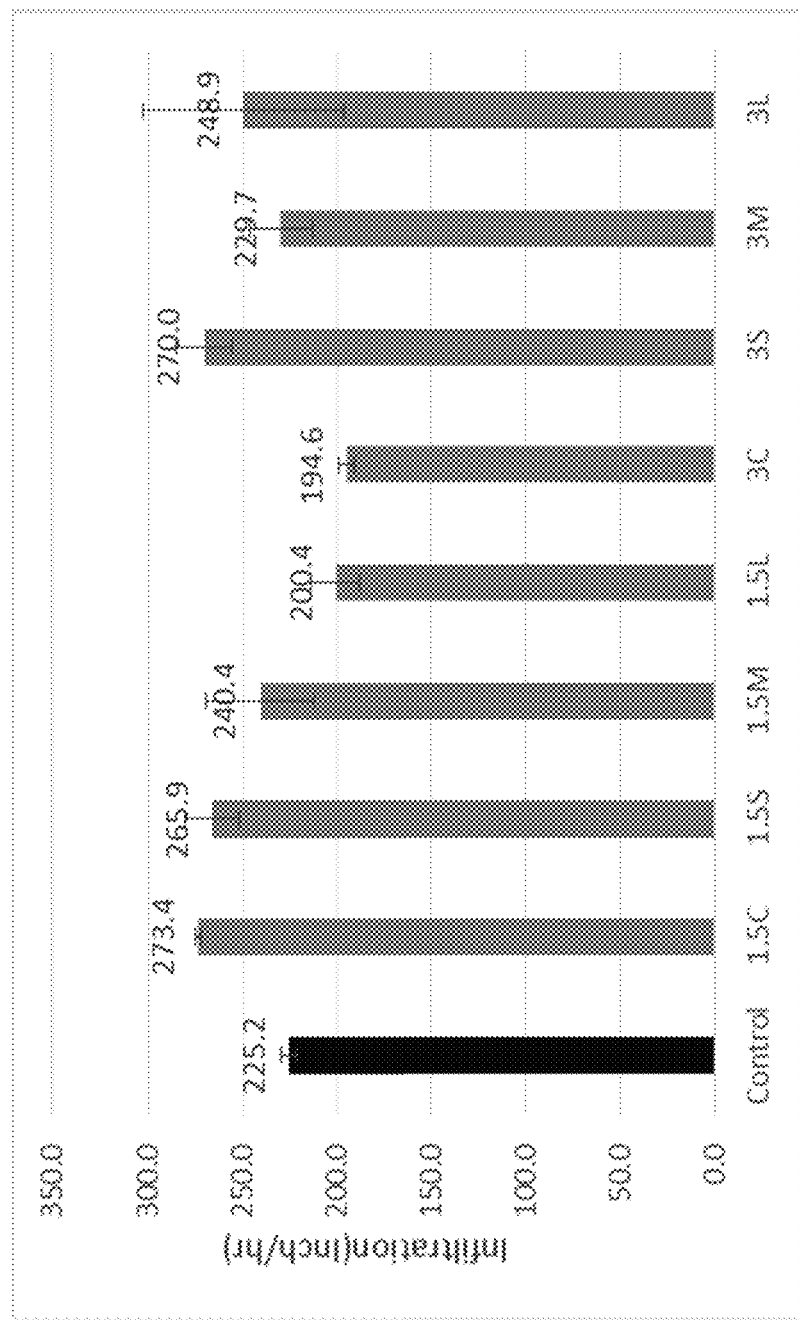
FIG. 13 illustrates an exemplary graphical representation of infiltration rates of exemplary asphalt compositions according to some aspects of the present disclosure.

FIG. 12 illustrates the average mass loss from Cantabro and surface abrasion test for all PC specimens. Specimen M1.5 was the only rPC specimen that outperformed the control specimen in terms of average mass loss on the Cantabro test. Specimen L1.5 had the highest average mass loss on the Cantabro test, about 40 percent after 500 cycles. Specimen C0.5 presented lower mass loss on the surface abrasion test than the control composition. Mass loss of specimens C1.5 and M1.5 was very close to that of the control specimen. Specimen L1.5 presented the highest mass loss on the abrasion test (about 0.66 percent on average), while the average mass loss of the control specimen was about 0.2 percent. Relatively high abrasion resistance of the specimen M1.5 corresponded to its relatively high resistance during the Cantabro test, as well as its relatively high 7-day tensile strength. The specimen L1.5 was characterized with the highest mass losses on both tests. Specimens C0.5 and C1.5 demonstrated high abrasion resistance, followed with mid-range mass losses on Cantabro. Specimens C1, S1.5 and L1.5 were characterized with relatively low abrasion resistance at both abrasion and Cantabro tests.

In order to determine which mechanical properties (7-day $f_c$, 28-day $f_t$ and $E_c$) best corresponded to the resistance to degradation, based on the Cantabro test, and surface abrasion, Pearson correlation factors with corresponding p-values were calculated and presented in TABLE 5.

TABLE 5

|  |  | Control | C0.5 | C1 | C1.5 | S1.5 | M1.5 | L1.5 |
|---|---|---|---|---|---|---|---|---|
| Cantabro | 28-day $f_c$ | −0.799 | 0.916 | 0.649 | 0.927 | NA | 0.524 | 0.384 |
|  | p-value | 0.201 | 0.084 | 0.351 | 0.073 | NA | 0.476 | 0.616 |
|  | 7-day $f_t$ | 0.21 | 0.967 | 0.49 | 0.508 | NA | −0.419 | 0.035 |
|  | p-value | 0.79 | 0.033 | 0.51 | 0.492 | NA | 0.419 | 0.035 |
|  | $E_c$ | −0.308 | 0.875 | 0.361 | 0.696 | NA | 0.211 | 0.119 |
|  | p-value | 0.692 | 0.125 | 0.639 | 0.304 | NA | 0.789 | 0.881 |
| Surface abrasion | 28-day $f_c$ | −0.153 | −0.554 | 0.441 | −0.904 | 0.890 | −0.197 | 0.898 |
|  | p-value | 0.847 | 0.446 | 0.559 | 0.096 | 0.11 | 0.803 | 0.102 |
|  | 7-day $f_t$ | −0.353 | −0.285 | −0.553 | −0.455 | −0.821 | −0.058 | 0.392 |
|  | p-value | 0.647 | 0.715 | 0.447 | 0.545 | 0.179 | 0.942 | 0.608 |
|  | $E_c$ | −0.769 | −0.768 | 0.753 | −0.224 | 0.804 | 0.517 | −0.518 |
|  | p-value | 0.231 | 0.232 | 0.247 | 0.776 | 0.196 | 0.483 | 0.482 |

As seen in TABLE 5, resistance to degradation based on the Cantabro test correlated relatively well with 28-day $f_c$ and 7-day $f_t$ in the case of specimens with a combined CCFCM fraction. In the case of specimen C0.5, resistance to degradation correlated well with all three examined mechanical parameters. For specimens M1.5, L1.5 and the control specimen, significant linear correlation between the degradation resistance and mechanical properties was not established. A strong correlation between the surface abrasion resistance and mechanical properties was not defined. Moreover, as TABLE 5 shows, most correlation factors were negative, which indicated that higher mechanical properties were associated with lower performance on the surface abrasion test. However, it was noted that losses on surface abrasion tests were relatively low (below about 0.6 percent) and the values of the remaining mass percentage were dispersed around a very small range.

Consequently, the experimental study described herein was designed and executed in order to investigate the ease and feasibility of mixing PC material with CCFCM. The use of CCFCM with the PC material resulted in improved characteristics of the reinforced PC specimens including significantly improved workability associated with lower and more consistent porosity compared to the control specimen. Increased workability desirably eased the placement, finishing, and/or compaction in real-world applications, and provided more time for placement especially during extreme working conditions. Despite the lower porosity, the infiltration rates were desirably increased in the same specimen. Other improved characteristics included higher gains in $f_c$ compared to the control specimen, which indicated that CCFCM desirably influenced the hydration process. Additionally, the improved characteristics of the reinforced specimens further included, an increased $f_t$, an increased $E_c$, high resistance to degradation, and high resistance to surface abrasion as compared to the control specimen.

EXAMPLE 2

An experiment was designed to investigate the effect of adding different quantities of CCFCM to a porous asphalt (PA) material. The results of the testing determined that the addition of the CCFCM resulted in the reinforced PA (rPA) compositions having improved characteristics. Therefore, experimental samples or specimens of various compositions include one control composition, four rPA compositions containing a volume size fraction of a same size and different size fractions of the processed CCFCM, and four rPA compositions containing a volume size fraction of a same size and different size fractions of the processed CCFCM.

Figure 14:
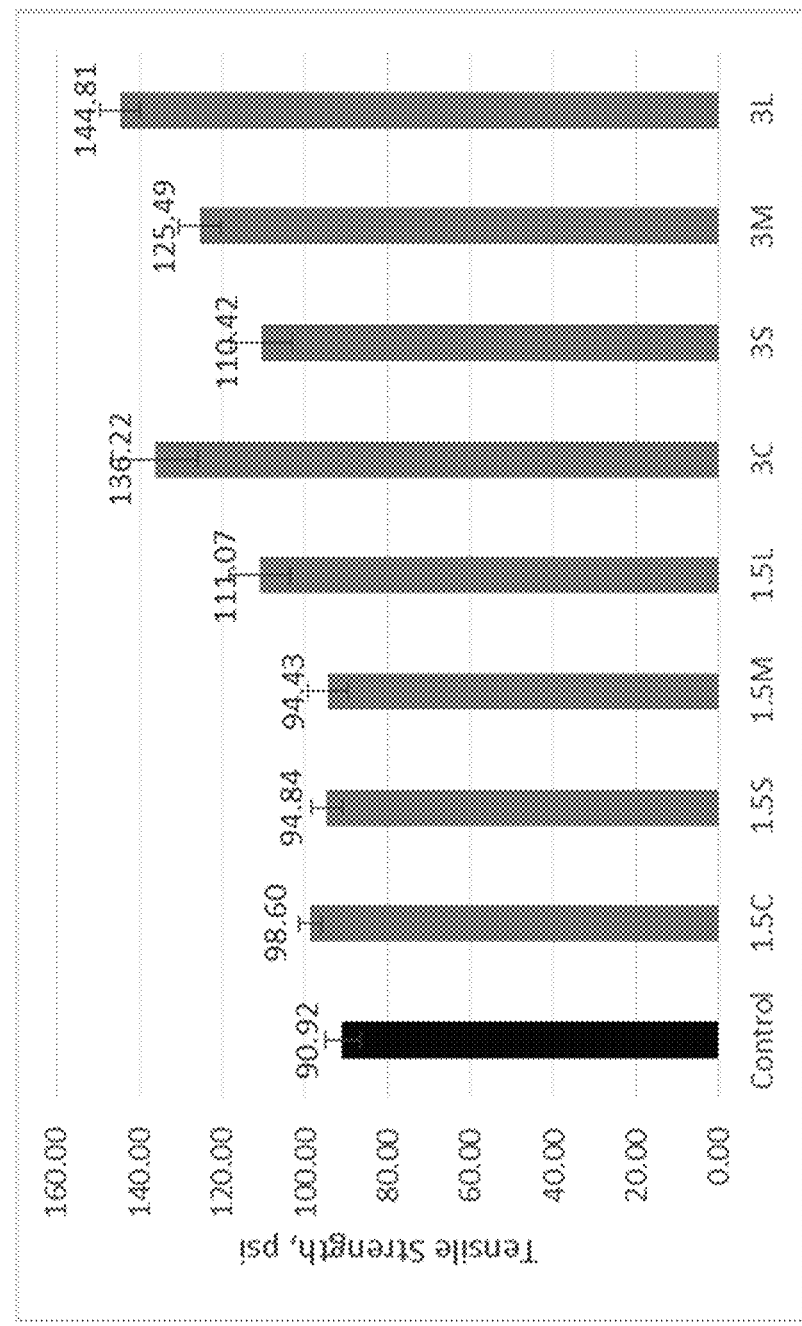
FIG. 14 illustrates an exemplary graphical representation of tensile strength values for exemplary asphalt compositions calculated from an indirect tensile test procedure according to some aspects of the present disclosure.

In some aspects, compared with the experimental rPC specimens in EXAMPLE 1, four of the rPA specimens included a higher load of CCFCM (i.e., 3 percent by weight). As with the rPC specimens, the infiltration rates of the rPA also improved with some CCFCM dosages as the porosities remained similar. The mechanical structure of the rPA specimens were also generally improved relative to the control specimen. Using the indirect tensile test procedures on the fabricated cylinders, all rPA specimens exhibited increased tensile performance, with those specimens including a high percentage and larger size CCFCM (e.g., specimen 3L) providing the most benefit to the tensile strength as seen in FIG. 14. Accordingly, the increased or maintained split tensile strength corresponds to an addition of about three percent of carbon fibers having a particle size smaller than about 3.35 mm and larger than about 2.00 mm to the quantity of the pavement material, such that the increased or maintained split tensile strength, in one instance, is about 0.5 MPa to about 5 MPa.

A rutting test was also performed to assess the wear performance of the specimens. As FIG. 15 illustrates, the rPA specimens showed a reduction in nit depth with the addition of CCFCM to the PA material. This increase in performance was also seen in the Cantabro test where a reduction in the weight loss was found with the rPA specimens.

Consequently, the experimental study described herein was designed and executed in order to investigate the ease and feasibility of mixing PA material with CCFCM. The use of CCFCM with the PA material resulted in improved characteristics of the reinforced PA composition including increased tensile strength, increased infiltration rates, and/or reduction in rut depth.

Referring now to FIG. 16, an exemplary method generally referred to as 100, is provided. The method 100 includes a method for making a permeable pavement composition, such as that referred to herein. In a first step, 102, a quantity of pavement material is provided. The pavement material is, in some aspects, PA or PC.

In a second step, 104, a quantity of cured carbon fiber composite material CCFCM is added to the pavement material to produce a reinforced composition having improved characteristics.

Adding the quantity of CCFCM comprises adding the quantity of CCFCM comprising carbon fibers incorporated with a binding polymer.

Prior to step 104, elements of the CCFCM are separated from the CCFCM by mechanical deconstruction using, for example, a mechanical refinement mechanism.

The elements of the CCFCM are further separated into different particle size fractions relative to a weight by volume percentage of the composition.

Adding the quantity of CCFCM to the pavement material to produce the reinforced composition having improved characteristics comprises producing a reinforced composition having a porosity of about 15 percent to about 35 percent air voids.

In some aspects, adding the quantity of CCFCM to the pavement material to produce the reinforced composition having improved characteristics comprises producing a reinforced composition having a maintained or decreased porosity, an increased or maintained infiltration rate, an increased or maintained split tensile strength, an increased or maintained compressive strength, an improved or maintained modulus of elasticity, an improved or maintained abrasion resistance, increased ductility, improved or maintained fatigue cracking resistance, improved or maintained low temperature cracking, or improved or maintained rutting resistance.

The reinforced composition can be utilized in transportation applications (e.g., bike lanes, pedestrian walkways, sidewalks, parking lots, roadways and others, etc.)

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A reinforced, permeable pavement composition comprising:
   a first quantity of a porous concrete material; and
   a second quantity of mechanically deconstructed cured carbon fiber composite material (CCFCM) particles,
   wherein the CCFCM particles have a particle size smaller than 3.35 mm, and wherein the composition has a porosity between 15% and 35% and an infiltration rate from 200 to 3000 inches/hour.

2. The composition of claim 1, wherein the porous concrete material comprises a coarse aggregate with a maximum aggregate size of less than or equal to ⅜ inch.

3. The composition of claim 1, wherein the porous concrete material comprises 10-40 wt. % of one or more of the following ingredients: fly ash, slag, or silica fume, or combinations thereof.

4. The composition of claim 1, wherein the porous concrete material comprises a rheology modifying admixture.

5. The composition of claim 1, wherein a concentration of the CCFCM particles in the reinforced permeable pavement composition ranges from 0.5 vol. % to 6.0 vol. % of the reinforced permeable pavement composition.

6. The composition of claim 5, wherein the concentration of the CCFCM particles in the reinforced permeable pavement composition ranges from 0.5 vol. % to 1.5 Vol. % of the reinforced permeable pavement composition.

7. The composition of claim 1, wherein an amount of interconnected porosity in the reinforced permeable pavement composition ranges from 15 vol % to 35 vol. % of air voids.

8. The composition of claim 1, wherein a concentration of the CCFCM particles in the reinforced permeable pavement composition ranges from 0.5 vol. % to 1.5 vol. % of the reinforced permeable pavement composition, and
   wherein a water infiltration rate of the reinforced permeable pavement composition ranges from 200 to 3000 inches/hour.

9. The composition of claim 1, wherein an average 28-day compressive strength ($f'_c$) of the is 20 MPa or greater.

10. The composition of claim 1, wherein the porous concrete material comprises no fine aggregates.

11. The composition of claim 1, wherein the porous concrete material comprises a porous concrete mixture comprising the following ingredients:
    (a) coarse aggregate ranging from 1000 to 4000 kg per 1 cubic meter of porous concrete mixture;
    (b) fine aggregate ranging from 0 to 200 kg per 1 cubic meter of porous concrete mixture;
    (c) water ranging from 50 to 150 kg per 1 cubic meter of porous concrete mixture; and
    (d) Portland cement ranging from 150 to 320 kg per 1 cubic meter of porous concrete mixture.

12. The composition of claim 1, wherein the composition has a porosity between 18% and 28%.

13. The composition of claim 1, wherein the has a porosity between 20% and 25%.

14. The composition of claim 1, wherein the composition has a porosity between 22% and 24%.

15. The composition of claim 1, wherein the CCFCM particles have a particle size smaller than 3.35 mm and larger than 2.00 mm.

16. The composition of claim 1, wherein the porous concrete material comprises 15 wt. % or less fly ash.

17. The composition of claim 11, wherein the coarse aggregate comprises an SSD crushed basalt coarse aggregate.

18. The composition of claim 11, wherein the porous concrete mixture comprises no fine aggregate.

19. A reinforced permeable composition, comprising:
a porous concrete material; and
mechanically deconstructed cured carbon fiber composite material (CCFCM) particles,
wherein the CCFCM particles have a particle size from 2.0 mm to 3.35 mm, and wherein the composition has a porosity between 20% and 25% and an infiltration rate from 200 to 3000 inches/hour.

20. The composition of claim 19, wherein the composition comprises from 0.5 vol. % to 1.5 Vol. % of the CCFCM particles based on the total volume of the composition.

\* \* \* \* \*